(12) United States Patent
Lee

(10) Patent No.: US 8,731,322 B2
(45) Date of Patent: May 20, 2014

(54) IMAGE BRIGHTNESS CONTROLLING APPARATUS AND METHOD THEREOF

(75) Inventor: Ho-young Lee, Seoul (KR)

(73) Assignee: Mtekvision Co., Ltd., Seoul (KR)

( * ) Notice: Subject to any disclaimer, the term of this patent is extended or adjusted under 35 U.S.C. 154(b) by 716 days.

(21) Appl. No.: 12/596,627

(22) PCT Filed: May 6, 2008

(86) PCT No.: PCT/KR2008/002524
§ 371 (c)(1),
(2), (4) Date: Oct. 19, 2009

(87) PCT Pub. No.: WO2008/136629
PCT Pub. Date: Nov. 13, 2008

(65) Prior Publication Data
US 2011/0206280 A1  Aug. 25, 2011

(30) Foreign Application Priority Data

May 3, 2007 (KR) .................. 10-2007-0043228
May 3, 2007 (KR) .................. 10-2007-0043252

(51) Int. Cl.
*G06K 9/00* (2006.01)
*G06K 9/40* (2006.01)

(52) U.S. Cl.
USPC ..................... 382/274; 382/167; 382/168

(58) Field of Classification Search
None
See application file for complete search history.

(56) References Cited

U.S. PATENT DOCUMENTS

| 5,315,389 | A | 5/1994 | Izawa et al. | |
|---|---|---|---|---|
| 5,808,697 | A | 9/1998 | Fujimura et al. | |
| 6,879,731 | B2 | 4/2005 | Kang et al. | |
| 2004/0008903 | A1* | 1/2004 | Kim | 382/274 |
| 2004/0169751 | A1 | 9/2004 | Takemura et al. | |
| 2007/0177050 | A1* | 8/2007 | Xiao et al. | 348/371 |
| 2007/0248282 | A1* | 10/2007 | Suzuki | 382/282 |
| 2008/0170798 | A1* | 7/2008 | Jia et al. | 382/274 |

FOREIGN PATENT DOCUMENTS

| JP | 9-65252 A | 3/1997 |
|---|---|---|
| KR | 10-2006-0070496 A | 6/2006 |
| WO | WO 2006123492 A1 * | 11/2006 |

* cited by examiner

*Primary Examiner* — Amir Alavi
*Assistant Examiner* — Kenny Cese
(74) *Attorney, Agent, or Firm* — Birch, Stewart, Kolasch & Birch

(57) ABSTRACT

Provided are an image brightness control device and an image brightness control method for improving the definition of brightness of the entire image and/or improving the definition of brightness of local areas using local brightness information. The image brightness controlling device includes: a preprocessing unit acquiring an offset table for controlling a dynamic range corresponding to an image range of an input image using brightness values of color data of the input image; and a tone mapping unit mapping the offset table onto the color data. It is possible to improve the definition of brightness so as to correspond to the characteristic of the input image, by automatically considering how to reflect a distribution characteristic of an image.

10 Claims, 16 Drawing Sheets

Fig. 1 - Prior Art

GTM

Original

Adaptive Luminance

IMAGE BRIGHTNESS CONTROLLING APPARATUS AND METHOD THEREOF

CROSS-REFERENCE TO RELATED APPLICATIONS

This application claims foreign priority benefits under 35 U.S.C. .sctn. 119(a)-(d) to PCT/KR08/002524, filed May 6, 2008, which is hereby incorporated by reference in its entirety.

BACKGROUND

1. Technical Field

The present invention relates to an image brightness controlling device, and more particularly, to an image brightness controlling device and a method thereof, which improves the definition of brightness by the use of the definition of brightness of an entire image and/or locally improves the definition of brightness by the use of local brightness information.

2. Description of the Related Art

Conventional methods of controlling a dynamic range of an input image are described as follows. In the following description, it is assumed that the input image has an n-bit resolution (where n is a natural number).

(1) Contrast Enhancement

A dynamic range is controlled between 0 and $2^n-1$ by applying the minimum pixel value and the maximum pixel value in an image to Expression 1.

$$\text{Output}=(2^n-1)\times(\text{Input}-\text{Min})/(\text{Max}-\text{Min}) \qquad \text{Expression 1}$$

Here, Output is a pixel value of an output image, Input is a pixel value of an input image, Max is the maximum pixel value of the input image, and Min is the minimum pixel value of the input image.

(2) Histogram Equalization

FIG. 1 is a transformation function graph of an input image and an output image to which a histogram equalization method is applied.

First, a cumulative density function (CDF) of pixel values in an image is calculated using histogram information of the image. Then, the scale of the cumulative density function is controlled between 0 and $2^n-1$ and the cumulative density function is used as a transformation function 100 of the input image and the output image.

When the number of specific pixel values is great, the slope of the transformation function 100 rapidly varies thereby enhancing the dynamic range of the corresponding pixel values.

In the contrast enhancement method or the histogram equalization method, the dynamic range is always controlled into values between 0 and $2^n-1$, regardless of the range of pixel values of the input image.

However, when the range of pixel values of the input image is very narrow but the dynamic range is forcibly enhanced into the values between 0 and $2^n-1$, the quality of image is not improved, but noises rather increases and the image is made to seem very unnatural.

In recent years, electronic apparatuses requiring an image processing device such as a digital camera, a camcorder, or a camera mounted on a mobile phone were widely used. When an image having high contrast is taken with the image processing device, an image biased to a dark side or a bright side is obtained. That is, when the dynamic range of an image is great, an image different from an image seen with a naked eye is obtained by the image processing device. Here, the dynamic range of an image means a range of brightness between the darkest part and the brightest part of the image. For example, when a person standing by a bright window is taken with a camera, an image of a dark person standing by the bright window is obtained which has been distinguished with a naked eye. An image improving algorithm such as a retinex algorithm is used to solve the above-mentioned problem.

An image brightness controlling method using a multi-scale retinex with color restoration (MSRCR) employs Expression 2.

$$R_i(x_1, x_2) = a_i(x_1, x_2) \qquad \text{Expression 2}$$

$$\sum_{k=1}^{K} W_k (\log I_i(x_1, x_2) - \log[F_k(x_1, x_2) \times I_i(x_1, x_2)])$$

$$i = 1, \ldots, S$$

$$F_k(x_1, x_2) = \kappa \exp[-(x_1^2 + x_2^2)/\sigma_k^2],$$

$$\kappa = 1 \Big/ \left( \sum_{x_1} \sum_{x_2} F(x_1, x_2) \right)$$

$$a_i(x_1, x_2) = \log\left( S I_i(x_1, x_2) \Big/ \sum_{n=1}^{S} I_n(x_1, x_2) \right)$$

Here, i represents an order of a spectral band, S represents a gray image when it is "1" and represents a color image when it is "3", $(x_1, x_2)$ represents a coordinate of an image, I represents an input image, R represents an output image having been subjected to the MSRCR process, $F_k$ represents a k-th Gaussian surround function, $\sigma_k$ represents a standard deviation of the k-th Gaussian surround function, K represents the number of surround functions, $W_k$ a weight (generally 1/K) associated with $F_k$, and $a_i$ represents a color restoration coefficient in an i-th spectral band.

Since the image brightness controlling method using Expression 2 is performed in a frequency domain, there is a problem with troublesome calculation such as Fourier transformation should be performed. In addition, plural frame memories for storing input images and Gaussian functions are required and an additional memory for storing a table for log calculation is also required. Since the calculation could not be performed in real time, there is also a problem in that the method could be performed only as a post process.

SUMMARY

Accordingly, a goal of the invention is to provide an image brightness controlling device and a method thereof, in which the contrast enhancement method and the histogram equalization method are properly combined depending on a range of pixel values of an input image on the basis of a characteristic that the contrast enhancement method is advantageous when the range of pixel values of the input image is narrow and the histogram equalization method using a distribution characteristic of pixel values is advantageous when the range of pixel values of the input image is wide.

Another goal of the invention is to provide an image brightness controlling device and a method thereof, which controls a dynamic range to be applied to an output image depending on the range of pixel values of an input image and improves the definition of brightness by automatically considering how a distribution characteristic of an image should be reflected.

Another goal of the invention is to provide an image brightness controlling device and a method thereof, which can improve the definition of brightness by controlling a degree of stretching in the unit of local regions of an input image.

Another goal of the invention is to provide an image brightness controlling device and a method thereof, which can easily acquire the natural quality of image with small noise by controlling input parameters (variance value and asymmetric parameters) in consideration of a degree of noise of an input image.

Another goal of the invention is to provide an image brightness controlling device and a method, which has an optimized memory using the minimum memory space without requiring troublesome calculations such as Fourier transform and several pieces of frame memories.

Another goal of the invention is to provide an image brightness controlling device and a method thereof, which is applicable in real time, by performing a tone mapping operation in the unit of pixels of a current frame of an image using information acquired from a previous frame.

According to an aspect of the invention, there is provided an image brightness controlling device for controlling the definition of brightness of an output image depending on a brightness characteristic of an input image.

An image brightness controlling device according to an embodiment of the invention may include: a preprocessing unit acquiring an offset table for controlling a dynamic range corresponding to an image range of an input image using brightness values of color data of the input image; and a tone mapping unit mapping the offset table onto the color data.

The preprocessing unit may include: a dynamic range information acquiring unit setting a predetermined region of the brightness values of pixels of the input image as the image range; a stretching unit stretching the brightness values of the input image by combining the image range and a brightness control strength; and an offset calculating unit calculating ratios of the brightness values in the input image and calculating offset values of the brightness values from the ratios.

The dynamic range information acquiring unit may include: a histogram acquiring unit expressing the number of cases where the brightness values appear in the pixels of the input image as a histogram; a cumulative density function (CDF) calculating unit calculating a cumulative density function obtained by accumulating the histogram with respect to the brightness values; and an image range setting unit setting a predetermined area of the cumulative density function to the image range.

The image range setting unit may set the brightness values of the pixels, in which the values obtained by dividing the values of the cumulative density function of the pixels by the size of the input image correspond to a boundary predetermined or input by a user, as a global minimum value (global_min) and a global maximum value (global_max). The stretching unit may determine a dynamic range to be applied to an output image by combining the global minimum value and the global maximum value and the brightness control strength predetermined or input by the user.

The offset calculating unit may calculate a ratio at which a current brightness value occupies the input image from the value of the cumulative density function of the brightness values of the input image, and calculates the offset value from the ratio. The offset calculating unit may calculate the offset values of all the pixels of the input image to acquire the offset table.

The color data may be HSV data and the preprocessing unit may control the dynamic range using the value of V of the HSV data.

The color data may be YUV data or YCbCr data and the preprocessing unit may control the dynamic range using the value of Y of the color data.

The preprocessing unit may acquire local brightness averages of local areas obtained by dividing the input image into local areas having a predetermined size, and the tone mapping unit may perform a local tone mapping operation by comparing a bias applied value using a bias curve with a predicted average of a pixel in the input image predicted from the local brightness values.

An image brightness control device according to another embodiment of the invention may include: a preprocessing unit acquiring dynamic range information corresponding to an image range of an input image using brightness values of color data of the input image and acquiring local brightness averages of local areas obtained by dividing the input image into the local areas having a predetermined size; and a tone mapping unit performing a local tone mapping operation by comparing a bias applied value using a bias curve with a predicted average of a pixel in the input image predicted from the local brightness values.

The tone mapping unit may acquire the bias applied value of a pixel in the input image, calculate the predicted average from the local brightness averages, and stretch the brightness value of the pixel.

The preprocessing unit may include: a dynamic range information acquiring unit setting a predetermined region of the brightness values of the pixels of the input image as an image range; and a local brightness average calculating unit dividing the input image to a plurality of local areas and then calculating the local brightness averages which are averages of the brightness values of the pixels in the plurality of local areas.

The dynamic range information acquiring unit may include: a histogram acquiring unit expressing the number of cases where the brightness values appear in the pixels of the input image as a histogram; a cumulative density function (CDF) calculating unit calculating a cumulative density function obtained by accumulating the histogram with respect to the brightness values; and an image range setting unit setting a predetermined area of the cumulative density function to the image range.

The tone mapping unit may include: a bias curve applying unit acquiring the bias applied value by applying the brightness value of the pixel to the bias curve, wherein the bias applied value is less than the brightness value when the brightness value of the pixel is equal to or greater than a threshold value and is greater than the brightness value when the brightness value is less than the threshold value; a predicted average calculating unit calculating the predicted average from the local brightness averages by the use of a bi-linear interpolation method; and a stretching unit stretching the brightness value using a difference between the bias applied value and the predicted average.

The stretching unit may apply a weight predetermined or input from a user to the difference between the bias applied value and the predicted average. The weight may be set to enhance the degree of stretching as the dynamic range based on the dynamic range information is wider. The weight may be independently controlled on the basis of an asymmetry parameter input from the user.

According to another aspect of the invention, there is provided an image brightness controlling method of controlling the definition of brightness of an output image depending on a brightness characteristic of an input image and a recording medium having a program for executing the method.

An image brightness controlling method according to an embodiment of the invention may include the steps of: acquiring an offset table for controlling a dynamic range corresponding to an image range of an input image using brightness values of color data of the input image; and mapping the offset table onto the color data.

The step of acquiring the offset table may include the steps of: setting a predetermined region of the brightness values of pixels of the input image as the image range; stretching the brightness values of the input image by combining the image range and a brightness control strength.

The step of setting a predetermined area of the brightness values of the pixels in the input image may include the steps of: acquiring a histogram from the number of cases where the brightness values appear in the pixels of the input image as a histogram; calculating a cumulative density function obtained by accumulating the histogram with respect to the brightness values; and setting a predetermined area of the cumulative density function to the image range.

The image brightness controlling method may further include the steps of: after the step of stretching the brightness values of the input image by combining the image range and the brightness control strength, calculating ratios of the brightness values in the input image from the cumulative density function; and calculating offset values of the brightness values from the ratios.

The step of setting the image range may include setting the brightness values of the pixels, in which the values obtained by dividing the values of the cumulative density function of the pixels by the size of the input image correspond to a boundary predetermined or input by a user, as a global minimum value and a global maximum value.

The step of stretching may include determining a dynamic range to be applied to an output image by combining the global minimum value and the global maximum value and the brightness control strength predetermined or input by the user.

The step of calculating the offset may include calculating a ratio at which a current brightness value occupies the input image from the value of the cumulative density function of the brightness values of the input image, and calculates the offset value from the ratio.

The step of calculating the offset may include calculating the offset values of all the pixels of the input image to acquire the offset table.

The color data may be HSV data and the step of calculating the offset table may include controlling the dynamic range using the value of V of the HSV data.

Alternatively, the color data may be YUV data or YCbCr data and the step of calculating the offset table may include controlling the dynamic range using the value of Y of the color data.

The image brightness control method may further include the steps of: acquiring local brightness averages of local areas obtained by dividing the input image into local areas having a predetermined size, and performing a local tone mapping operation by comparing a bias applied value using a bias curve with a predicted average of a pixel in the input image predicted from the local brightness values.

An image brightness control method according to another aspect of the invention may include the steps of: acquiring dynamic range information corresponding to an image range of an input image using brightness values of color data of the input image; acquiring local brightness averages of local areas obtained by dividing the input image into the local areas having a predetermined size; and performing a local tone mapping operation by comparing a bias applied value using a bias curve with a predicted average of a pixel in the input image predicted from the local brightness values.

The step of acquiring the dynamic range information may include the steps of: expressing the number of cases where the brightness values appear in the pixels of the input image as a histogram; calculating a cumulative density function (CDF) obtained by accumulating the histogram with respect to the brightness values; and setting a predetermined area of the cumulative density function to the image range.

The step of calculating the local brightness averages may include the steps of: dividing the input image to a plurality of local areas; and calculating the local brightness averages which are averages of the brightness values of the pixels in the plurality of local areas.

The step of performing the local tone mapping operation may include the steps of: acquiring the bias applied value by applying the brightness value of the pixel to the bias curve, wherein the bias applied value is less than the brightness value when the brightness value of the pixel is equal to or greater than a threshold value and is greater than the brightness value when the brightness value is less than the threshold value; calculating the predicted average from the local brightness averages by the use of a bi-linear interpolation method; and stretching the brightness value using a difference between the bias applied value and the predicted average.

The step of stretching the brightness values may include applying a weight predetermined or input from a user to the difference between the bias applied value and the predicted average.

The weight may be set to enhance the degree of stretching as the dynamic range based on the dynamic range information is wider. The weight may be independently controlled on the basis of an asymmetry parameter input from the user.

The other aspects, features, and advantages of the invention will become apparent from the accompanying drawings, the appended claims, and the detailed description of the invention.

DETAILED DESCRIPTION

Figure 1:
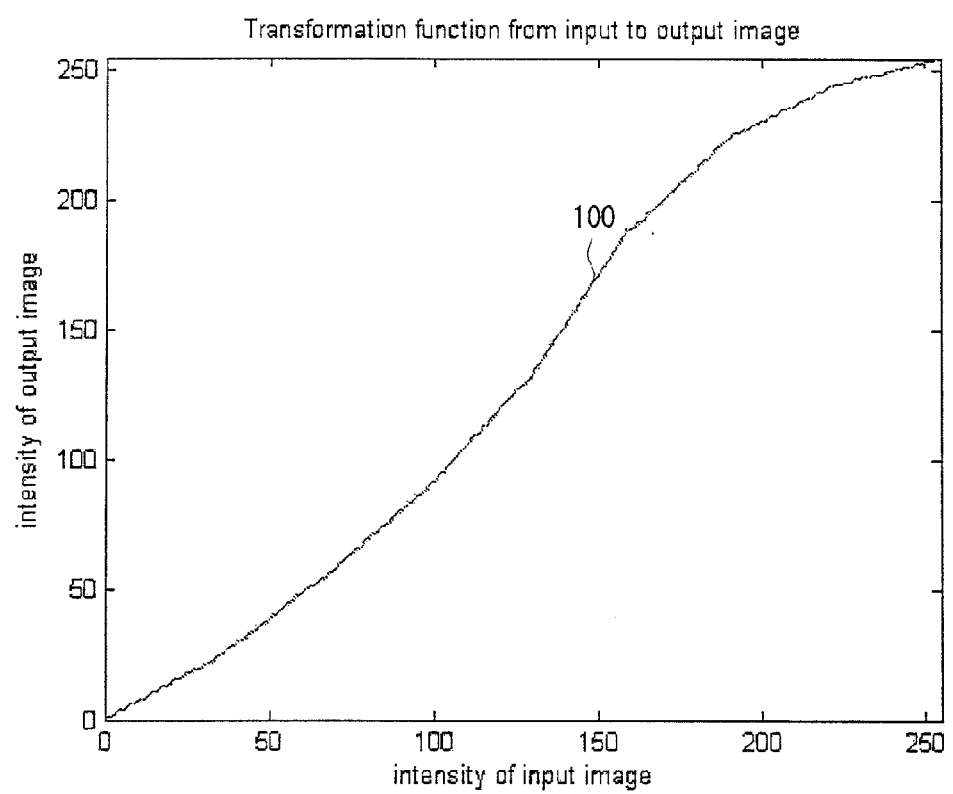
FIG. 1 is a graph illustrating a transformation function of an input image and an output image to which the histogram equalization method should be applied.

The above-mentioned goals, features, and advantages of the invention will be apparent from the following detailed description with reference to the accompanying drawings.

The invention can be variously modified in various embodiments and specific embodiments will be described and shown in the drawings. The invention is not limited to the embodiments, but it should be understood that the invention includes all the modifications, equivalents, and replacements belonging to the spirit and the technical scope of the invention. When it is determined that detailed description of known techniques associated with the invention makes the gist of the invention obscure, the detailed description will be omitted.

Terms, "first", "second", and the like, can be used to describe various elements, but the elements are not limited to the terms. The terms are used only to distinguish one element from another element. For example, without departing from the scope of the invention, a first element may be named a second element and the second element may be named the first element similarly. The term, "and/or", includes a combination of plural elements or any one of the plural elements.

If it is mentioned that an element is "connected to" or "coupled to" another element, it should be understood that the element may be connected or coupled directly to another element or that still another element may be interposed therebetween. On the contrary, if it is mentioned that an element is "connected directly to" or "coupled directly to" another element, it should be understood that still another element is not interposed therebetween.

The terms used in the following description are used to merely describe specific embodiment, but are not intended to limit the invention. An expression of the singular number includes an expression of the plural number, so long as it is clearly read differently. The terms such as "include", "have", and the like are intended to indicate that features, numbers, steps, operations, elements, components, or combinations thereof used in the following description exist and that the possibility of existence or addition of one or more different features, numbers, steps, operations, elements, components, or combinations thereof is not excluded.

So long as they are not defined differently, all the terms used therein, which include technical or scientific terms, have the same meanings as generally understood by those skilled in the art. It should be analyzed that the terms defined in dictionaries used in general have the same meaning as in the contexts of the related art, but the terms should not be analyzed ideal or excessively formal.

Hereinafter, exemplary embodiments of the invention will be described in detail with reference to the accompanying drawings. Like or corresponding elements are denoted by like reference numerals regardless of the drawing number and repeated description thereof is omitted.

Figure 2:
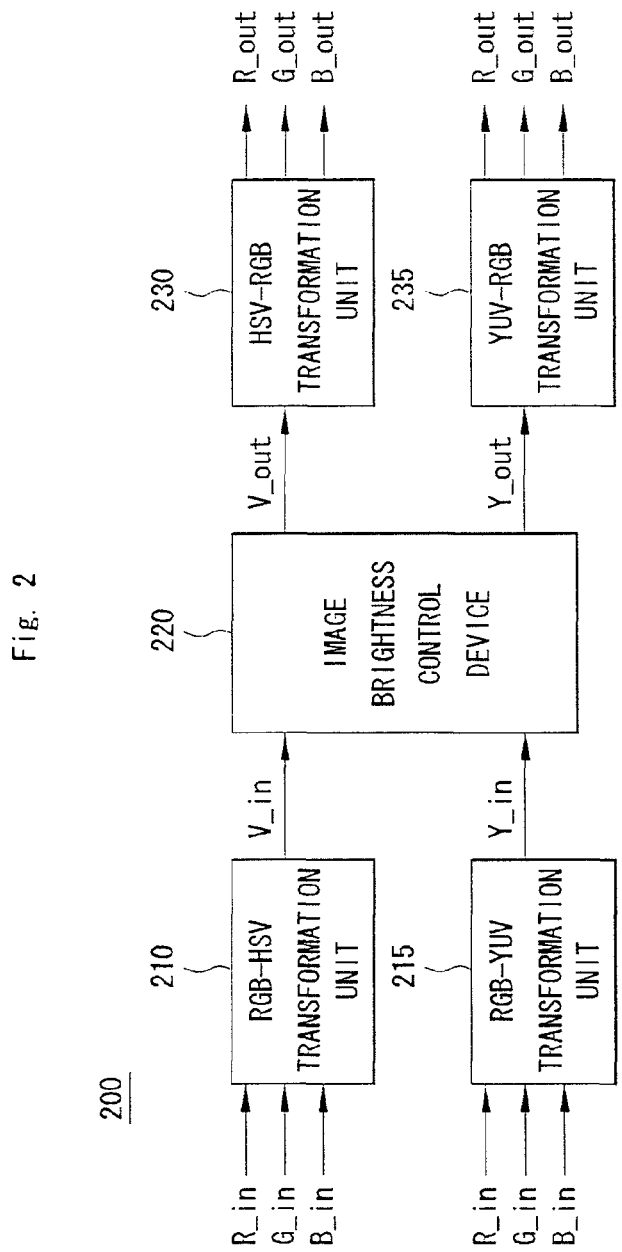
FIG. 2 is a diagram schematically illustrating a configuration of an imaging apparatus according to an embodiment of the invention.

FIG. 2 is a diagram schematically illustrating a configuration of an imaging apparatus according to an embodiment of the invention.

An imaging apparatus 200 according to an embodiment of the invention includes an RGB-HSV transformation unit 210, an image brightness controlling device 220, and an HSV-RGB transformation unit 230. An imaging apparatus 200 according to another embodiment of the invention includes an RGB-YUV transformation unit 215, an image brightness controlling device 220, and a YUV-RGB transformation unit 235.

The imaging apparatus 200 according to the embodiment transforms RGB data into HSV data of the color data, performs an image brightness controlling operation, and then transforms the HSV data into the RGB data again.

The RGB-HSV transformation unit 210 transforms the RGB data of an input image into the HSV data. In general, the input image has the RGB data as image information of pixels. In order to control the image brightness according to this embodiment, it is necessary to treat the image information in a HSV color model.

In an RGB color model, any color is expressed by a compound color component of three colors of red (R), green (G), and blue (B) as the three primary colors. The principle of additional mixture is applied to a color, and when three values of R, G, and B are 0, a black color is obtained.

In a CMY color model, three colors of cyan (C), magenta (M), and yellow (Y) are used as the primary colors and any color is expressed by a compound color component of the three primary colors. In this case, the principle of subtractive mixture is applied to a color, and when three values of C, M, and Y are 0, a white color is obtained.

The HSV color model is a model relatively matched with a human feeling on colors. Six colors of R, Y, G, C, B, and M are used as the primary colors, are arranged in a circular circumference at an interval of 60 degrees, and colors obtained by dividing them at an equivalent interval are made by means of combination of the adjacent primary colors, thereby completing the entire circumference, which is called a hue ring. A position in the hue ring is an H value of a hue. The saturation S has the greater value as it goes to the edge in a CIE Chromaticity diagram. When the value is 0, a center white color is obtained. The value V represents the brightness of a color.

The RGB-HSV transformation unit 210 transforms pixel values (R, G, and B values) of the input image corresponding to the RGB color model into pixel values (H, S, and V values) corresponding to the HSV color model.

The value of H indicates a hue, that is, the kind of colors (color components such as red, yellow, and blue), and expresses all the expressible colors in the range of 0 to 360. In general, it is normalized in the range of 0 to 100%. The value of S indicates saturation, that is, the definition of colors, and the smaller value of S means that it is closer to an achromatic color. The value of V indicates a value, that is, the brightness of colors, in the range of 0 to 100%. The smaller value of V means that it is darker and the greater value of V means that it is brighter.

The RGB-HSV transformation unit 210 performs the RGB-HSV transformation operation using Expression 3.

Expression 3

$$H = \begin{cases} 60 \times \frac{G-B}{MAX-MIN} + 0, & \text{if } MAX = R \text{ and } G \geq B \\ 60 \times \frac{G-B}{MAX-MIN} + 360, & \text{if } MAX = R \text{ and } G < B \\ 60 \times \frac{B-R}{MAX-MIN} + 120, & \text{if } MAX = G \\ 60 \times \frac{R-G}{MAX-MIN} + 240, & \text{if } MAX = B \end{cases}$$

$$S = \frac{MAX - MIN}{MAX}$$

$$V = MAX$$

Here, MAX represents the maximum value of the R, G, and B values of each pixel of the input image and MIN represents the minimum value of the R, G, and B values of each pixel of the input image. H has a value in the range of 0 to 360 and S and V vary between 0 and 1.

When MAX and MIN are equal to each other (MAX=MIN, that is, S=0), H is not defined. When the value of S is 0, it means that it is an achromatic color and does not have any color component. When MAX is 0, S is not defined. When the value of V, it means that it has pure black and does not have any color component and any saturation component.

It is possible to acquire the values of H, S, and V of each pixel of the input image from Expression 3.

The image brightness control device 220 controls the definition of brightness of the whole image using the value of V of the values of H, S, and V of each pixel of the input image acquired by the RGB-HSV transformation unit 210.

The HSV-RGB transformation unit 230 transforms the values of H, S, and V of the image, the brightness value (V) of which has been controlled by the image brightness control device 220, into the values of R, G, and B. This corresponds to the inversion of the transformation performed by the RGB-HSV transformation unit 210.

An example of the HSV-RGB transformation is as follows.
(1) When the value of S is 0, the color is achromatic and R, G, and B correspond to the value of V.
(2) When the value of S is not 0, Expression 4 is applied.

$$H_i = \left\lfloor \frac{H}{60} \right\rfloor \bmod 6$$
$$f = \frac{H}{60} - H_i$$
$$p = V(1-S)$$
$$q = V(1-fS)$$
$$t = V(1-(1-f)S)$$
$$\text{if } H_i = 0 \rightarrow R = V, G = t, B = p$$
$$\text{if } H_i = 1 \rightarrow R = q, G = V, B = p$$
$$\text{if } H_i = 2 \rightarrow R = p, G = V, B = t$$
$$\text{if } H_i = 3 \rightarrow R = p, G = q, B = V$$
$$\text{if } H_i = 4 \rightarrow R = t, G = p, B = V$$
$$\text{if } H_i = 5 \rightarrow R = V, G = p, B = q$$

Expression 4

Here, mod N is a function indicating the remainder of division by N.

The imaging apparatus 200 transforms the input image as data in the RGB color model into an output image in the same color model.

However, an image brightness control device according to an embodiment of the invention uses the value of V which is the brightness value of the HSV data in the HSV color model to control the image brightness.

An image brightness control device 220 according to another embodiment of the invention uses the value of Y which is the brightness value of the YUV data in the YUV color model to control the image brightness.

The YUV color model is a color model using the fact that a human eye is the most sensitive to the intensity of light, where Y indicates the intensity of light, that is, luminance, and U and V indicate the chrominance.

An imaging apparatus 200 according to another embodiment of the invention includes an RGB-YUV transformation unit 215 and a YUV-RGB transformation unit 235.

The RGB-YUV transformation unit 215 transforms the pixel values (the values of R, G, and B) of the input image in the RGB color model into the pixel values (the values of Y, U, and V) in the YUV color model by the use of Expression 5.

$$Y = 0.299 \times R + 0.587 \times G + 0.114 \times B$$
$$U = -0.1687 \times R - 0.3313 \times G + 0.5 \times B + 128$$
$$V = 0.5 \times R - 0.4187 \times G - 0.0813 \times B + 128$$

Expression 5

The image brightness control device 220 controls the image brightness using the value of Y acquired from Expression 5 and a method described later.

The YUV-RGB transformation unit 235 transforms the values of Y, U, and V of each pixel of the image, the brightness value (the value of Y) has been controlled by the image brightness control device 220, into the values of R, G, and B. This operation corresponds to the inversion of the transformation performed by the RGB-YUV transformation unit 215 and uses Expression 6.

$$R = Y + 1.370705 \times (V - 128)$$
$$G = Y - 0.337633 \times (U - 128) - 0.698001 \times (V - 128)$$
$$B = Y + 1.732446 \times (U - 128)$$

Expression 6

An image brightness control device 220 according to another embodiment of the invention uses the value of Y which is the brightness value of YCbCr data in a YCbCr color model to control the image brightness.

That is, it should be understood by those skilled in the art that the image brightness control device 220 according to the invention controls the image brightness using the brightness value included in the color data and the invention is applicable to color data including the brightness value.

The HSV data of the color data will be mainly described now for the purpose of convenient understanding and description. The configuration and function of the image brightness control device 220 controlling the image brightness using the brightness value (the value of V) will be described in detail.

The image brightness control device 220 controls the image brightness using the brightness value of the input image. According to a first embodiment, an image brightness control device 220 can improve the definition of brightness of the whole image.

According to a second embodiment, an image brightness control device 220 can improve the definition of brightness of local areas of the image using the local brightness information. According to a third embodiment, an image brightness control device 220 can primarily improve the definition of brightness of the whole image and secondarily improve the definition of brightness of the local areas using the local brightness information.

Now, the image brightness control device 220 and a method for improving the definition of brightness of the whole image according to the first embodiment will be described.

Figure 3:
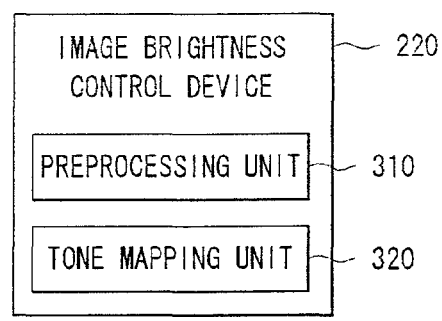
FIG. 3 is a diagram schematically illustrating an image brightness controlling device according to a first embodiment of the invention.
Figure 4:
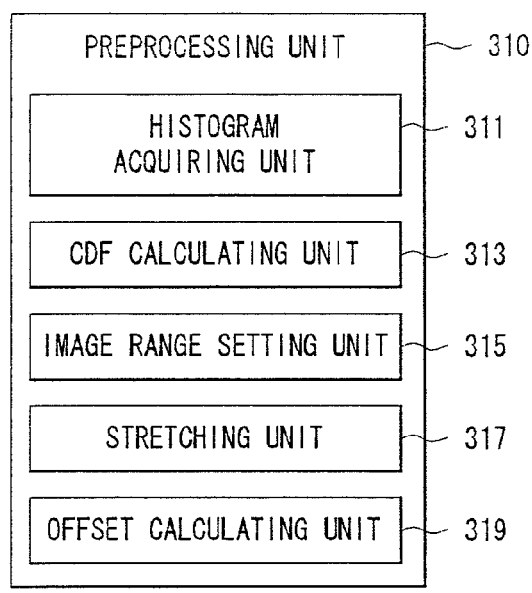
FIG. 4 is a diagram schematically illustrating a configuration of a preprocessing unit according to the first embodiment of the invention.
Figure 5:
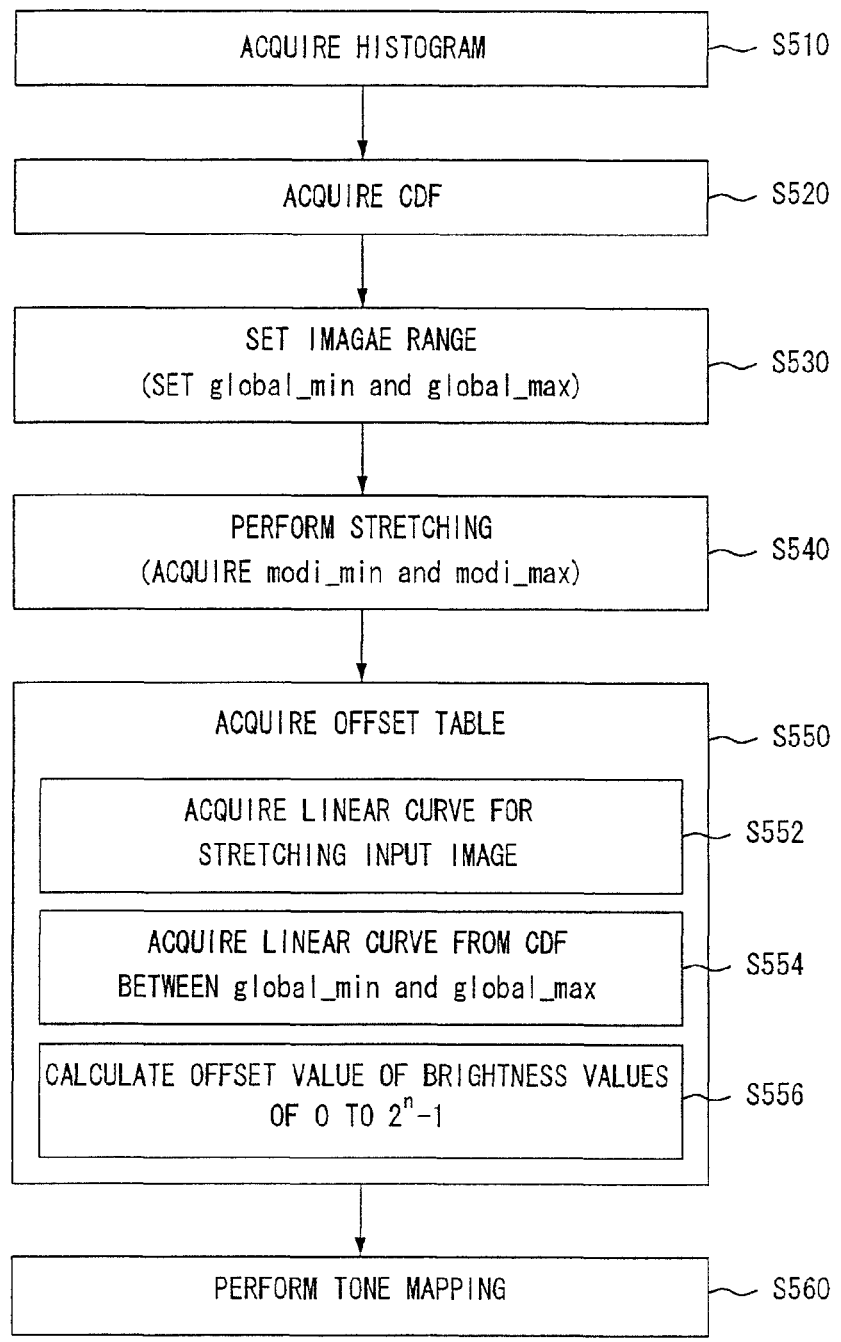
FIG. 5 is a flowchart illustrating an image brightness controlling method of the preprocessing unit according to the first embodiment of the invention.

FIG. 3 is a diagram schematically illustrating a configuration of the image brightness control device according to the first embodiment of the invention, FIG. 4 is a diagram schematically illustrating a configuration of the preprocessing unit according to the first embodiment of the invention, and FIG. 5 is a flow diagram illustrating a method of controlling the image brightness in the preprocessing unit according to the first embodiment of the invention.

The image brightness control device 220 according to the first embodiment of the invention includes a preprocessing unit 310 and a tone mapping unit 320 (see FIG. 3). The preprocessing unit 310 acquires an offset table from the input image and the tone mapping unit 320 maps the acquired offset table onto the input image.

Here, the preprocessing unit 310 acquires the offset table from the N-th frame of the input image and the tone mapping unit 320 can map the acquired offset table onto the N-th frame or the subsequent frames (such as the (N+1)-th frame and the (N+2)-th frame) of the input image.

Referring to FIG. 4, the preprocessing unit 310 includes a dynamic range information acquiring unit setting a predetermined area of the brightness values of the pixels in the input image to an image range, a stretching unit 317, and an offset calculating unit 319. Here, the dynamic range information acquiring unit includes a histogram acquiring unit 311, a CDF calculating unit 313, and an image range setting unit 315.

Now, it is assumed that the input image has an n-bit (where n is a natural number) resolution. The histogram acquiring unit 311 scales the brightness value V of the values of H, S, and V of each pixel of the input image in a range of 0 to $2^n$-1 and expresses the number of cases where the correspond value of V appears in the pixels in the input image by the use of a histogram.

The CDF calculating unit 313 calculates a cumulative density function (hereinafter, referred to as "CDF") in which the histogram acquired by the histogram acquiring unit 311 is accumulated from the brightness value of 0. When the brightness value is $2^n$-1, the maximum CDF value is equal to the size of the input image, that is, (the number of horizontal pixels)×(the number of vertical pixels), and means the total number of pixels of the input image.

Since the maximum CDF value is the size of the input image, that is, the total number of pixels of the input image, the normalized CDF (normed_CDF) obtained by normalizing the maximum CDF value depending on the brightness value may be further calculated. That is, when the brightness value is $2^n$-1, the maximum value can be normalized to be $2^n$-1.

The image range setting unit 315 sets the brightness values of the pixels, in which the values obtained by dividing the CDF values of the pixels by the size of the input image correspond to a boundary predetermined or input by a user, as a global minimum value (global_min) and a global maximum value (global_max) so as to acquire a distribution range of brightness of the pixels in the input image. When the value obtained by dividing the CDF value by the size of the input image corresponds to A (for example, 0.001), the brightness value can be set as the global minimum value. When the value obtained by dividing the CDF value by the size of the input image corresponds to B (for example, 0.999), the brightness value can be set as the global maximum value. Here, A and B are a real number between 0 and 1 and B is greater than A.

The selection in the range between the global minimum value and the global maximum value of the brightness values of the pixels in the input image is performed to exclude the influence on the noise. The brightness values of which the ratio in the image is almost zero, (for example, salt and pepper noise) are neglected to perform the image process according to the embodiment of the invention.

The stretching unit 317 stretches the brightness value of the input image by combining the global minimum value and the global maximum value set by the image range setting unit 315 and the brightness control strength as an input parameter predetermined or input from a user.

That is, the stretching unit acquires a modified minimum value (modi_min) which is a modified value of the global minimum value and a modified maximum value (modi_max) which is a modified value of the global maximum value and performs a stretching operation so as to locate the brightness values of the pixels of the input image, which have been located in the global minimum value and the global maximum value, in the modified minimum value and the modified maximum value. The modified minimum value and the modified maximum value determine the dynamic range to be applied to the output image.

The offset calculating unit 319 calculates a ratio at which the current brightness value occupies the input image from the CDF of the brightness values of the input image and calculates the offset value from the ratio. The offset calculating unit adds the calculated offset value to the brightness value of the image stretched by the stretching unit 317 to acquire an offset table of the brightness values of 0 to $2^n$-1. Here, by considering the reflection degree of the distribution characteristic of the input image which can be acquired from the CDF, it is possible to improve the definition of brightness in accordance with the characteristic of the input image.

The tone mapping unit 320 performs a tone mapping operation on the brightness values of the pixels by applying the offset table acquired by the preprocessing unit 310 to the input image. It is possible to improve the definition of brightness of the tone-mapped output image so as to correspond to the brightness distribution characteristic of the input image.

An image brightness controlling method of the image brightness control device 220 will be described in detail now with reference to FIG. 5. FIG. 5 is a flow diagram illustrating the image brightness controlling method according to an embodiment of the invention.

TABLE 1

| Terms | Description |
|---|---|
| image_size | Size information of image, that is, horizontal(width) × vertical(height). |
| Histogram | Brightness values V(0~1) are scaled to 0~$2^n$ − 1 and the number of cases where the values appear in image. |
| CDF | Function of histograms accumulated from 0 (maximum value is image_size when brightness value is $2^n$ − 1). |
| normed_CDF | Maximum CDF value is size of image, that is, horizontal × vertical. CDF obtained by normalizing it in the range of 0 to $2^n$ − 1. |
| Strength | Input parameter determining brightness range of image and/or brightness control strength. |
| Stretching | Process of widening brightness range of image using input parameter strength |
| global_min | Value of CDF/(width × height) corresponding to A (for example, 0.001). |
| global_max | Value of CDF/(width × height) corresponding to B (for example, 0.999). |
| modi_min | Modified value of global-min (stretching result) |
| modi_max | Modified value of global-max (stretching result) |
| offset_table | Table of offsets to be added to brightness values (0~255) |
| drange_val | Data indicating dynamic range of original image |

Table 1 shows meanings of terms used in the following description. The image brightness controlling method will be described with reference to Table 1.

The values of H, S, and V of the input image are acquired by the RGB-HSV conversion. The value of V, that is, the brightness value, is adjusted. Here, it is assumed that the brightness value of the input image has an n-bit (where n is a natural number) resolution.

The brightness values of the pixels in the input image are in the range of 0 to 1. The brightness values are scaled to the range of 0 to $2^n$-1 and the number of cases in which the values appear in the input image is expressed, thereby acquiring the histogram (step S510).

Then, the cumulative density function in which the acquired histogram is accumulated in the magnitude order of the brightness values (from 0 to $2^n-1$) is acquired (step S520). Here, when the brightness value is $2^n-1$, the maximum CDF value means the size of the input image, that is, (the number of horizontal pixels (width))×(the number of vertical pixels (height)), which is the total number of pixels in the input image.

The image range of the pixels in the input image is set (step S530). In order to find out the distribution range of the brightness values of the input image, the brightness values of the pixels, in which the values obtained by dividing the CDF values of the pixels by the size of the input image correspond to the boundary predetermined or input by a user, are set as the global minimum value (global_min) and the global maximum value (global_max).

When the value obtained by dividing the CDF value by the size of the input image corresponds to A (for example, 0.001), the brightness value can be set as the global minimum value. When the value obtained by dividing the CDF value by the size of the input image corresponds to B (for example, 0.999), the brightness value can be set as the global maximum value. Here, A and B are a real number between 0 and 1 and B is greater than A.

In addition, a 7-tap method can be used to smooth the CDF curve. The 7-tap method is a method using the average of the brightness values of the current pixel and the left three pixels and the right three pixels about the current pixel. The CDF curve can be further smoothed by the method.

Since the maximum CDF value is the size of the input image, that is, the total number of pixels in the input image, the normalized CDF (normed_CDF) obtained by normalizing the maximum CDF value to correspond to the brightness value may be further calculated. That is, when the brightness value is $2^n-1$, the maximum value can be normalized to be $2^n-1$.

The brightness values of the input image are stretched (step S540) by combining the global minimum value and the global maximum value set by the image range setting unit 315 and the brightness control strength as an input parameter predetermined or input from a user. That is, a modified minimum value (modi_min) which is a modified value of the global minimum value and a modified maximum value (modi_max) which is a modified value of the global maximum value are acquired and the stretching operation is performed so as to locate the brightness values of the pixels of the input image, which have been located in the global minimum value and the global maximum value, in the modified minimum value and the modified maximum value. The modified minimum value (modi_min) and the modified maximum value (modi_max) determine the dynamic range to be applied to the output image.

For example, the modified minimum value and the modified maximum value can be obtained using Expression 7.

modi_min=global_min−(global_min−0)×strength modi_max=global_max+(($2^n-1$)−global_max)× strength    Expression 7

Here, the brightness control strength is predetermined or input as an input parameter by a user. The brightness control strength is a parameter for determining the brightness range of an image and/or the control strength of the brightness values.

Then, the offset table is acquired (step S550).

At this time, a first linear curve for stretching the input image is first acquired (step S552). A second linear curve is acquired from the normalized CDF of the global minimum value and the global maximum value (step S554).

Examples of the first linear curve and the second linear curve are expressed by Expression 8.

$y$=gain1×$x$+offset1 (a first linear curve)

$y$=gain2×$x$+offset2 (a second linear curve)

gain1=(modi_max−modi_min)/(global_max− global_min)

offset1=−gain1×global_min+modi_min gain2=(Normed_CDF (1, global_max+1)− Normed_CDF (1,global_min+1))/(global_max− global_min)

offset2=−gain2×global_min+Normed_CDF (1,global_min+1))    Expression 8

Here, x represents the brightness value of the input image, y represents the stretched brightness value, gain1 and gain2 represent the slopes of the first and second linear curves, offset1 and offset2 represent intercepts of the first and second linear curves. The normed_CDF(1,a) represents the CDF value corresponding to (1,a) in the matrix of 1×$2^n$.

The offset table of the brightness values of 1 to $2^n-1$ is generated using gain1, gain2, offset1, and offset2 acquired from Expression 8 (step S556).

When the brightness value of a pixel is smaller than the global minimum value, the brightness value of the pixel is set as the global minimum value. When the brightness value of a pixel is greater than the global maximum value, the brightness value of the pixel is set as the global maximum value (see Expression 9).

Expression 9

```
for i = 0:2ⁿ−1
    if i<global_min
        value = global_min;
    else if i>global_max
        value = global_max;
    else
        value = i ;
```

Here, the brightness value (stretched_pixel) stretched by the use of the first linear curve of Expression 8 and the offset table is acquired by the use of Expression 10.

offset_table (1,$i$+1)=stretched_pixel+(Normed_CDF (1,value+1)−(gain2×value+offset2))×alpha    Expression 10

Here, offset_table(1,i+1) represents an offset value of the offset table corresponding to (1,i+1) in the matrixe of 1×$2^n$ and alpha is acquired from Expression 11.

alpha=strength×0.4×(1−(value−30)$^2$/($2^n-1$)$^2$)    Expression 11

By considering the reflection degree of the distribution characteristic of the input image which can be acquired from the CDF, that is, alpha, it is possible to improve the definition of brightness to correspond to the characteristic of the input image.

By applying the acquired offset table to the input image, the brightness values of the pixels are tone-mapped (step S560). The tone-mapped output image has the improved definition of brightness to correspond to the distribution characteristic of the input image.

Hitherto, the image brightness control device and the image brightness control method applied to the entire image have been described.

Hereinafter, an image brightness control device and an image brightness control method for improving the definition of brightness local images using local brightness information will be described.

Figure 6:
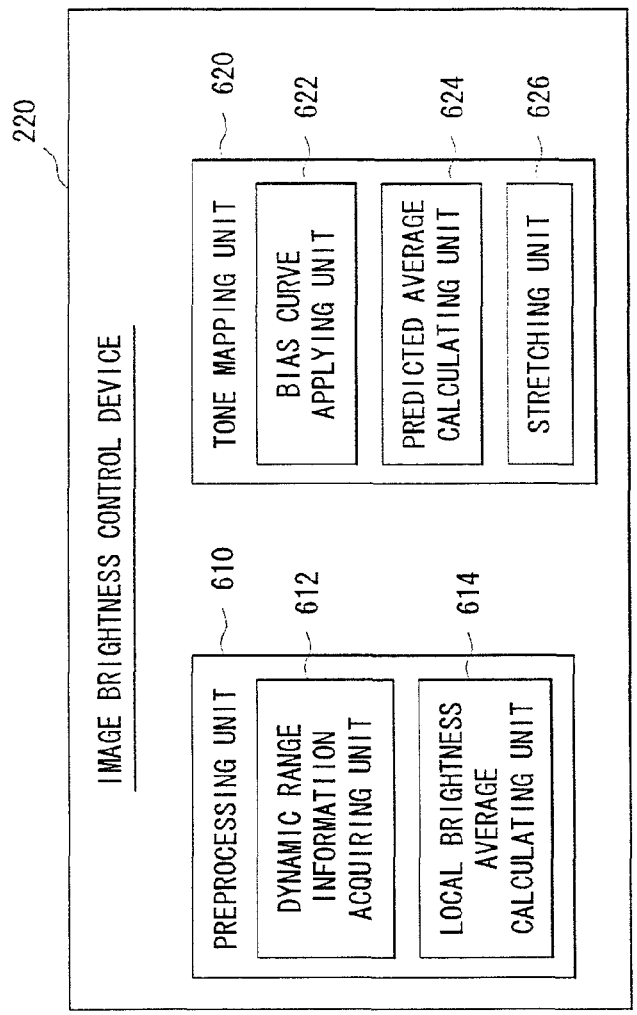
FIG. 6 is a diagram schematically illustrating an image brightness controlling device according to a second embodiment of the invention.
Figure 7:
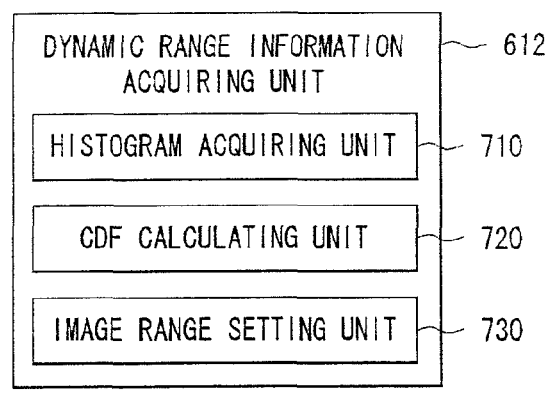
FIG. 7 is a diagram schematically illustrating a dynamic range information acquiring unit.
Figure 8:
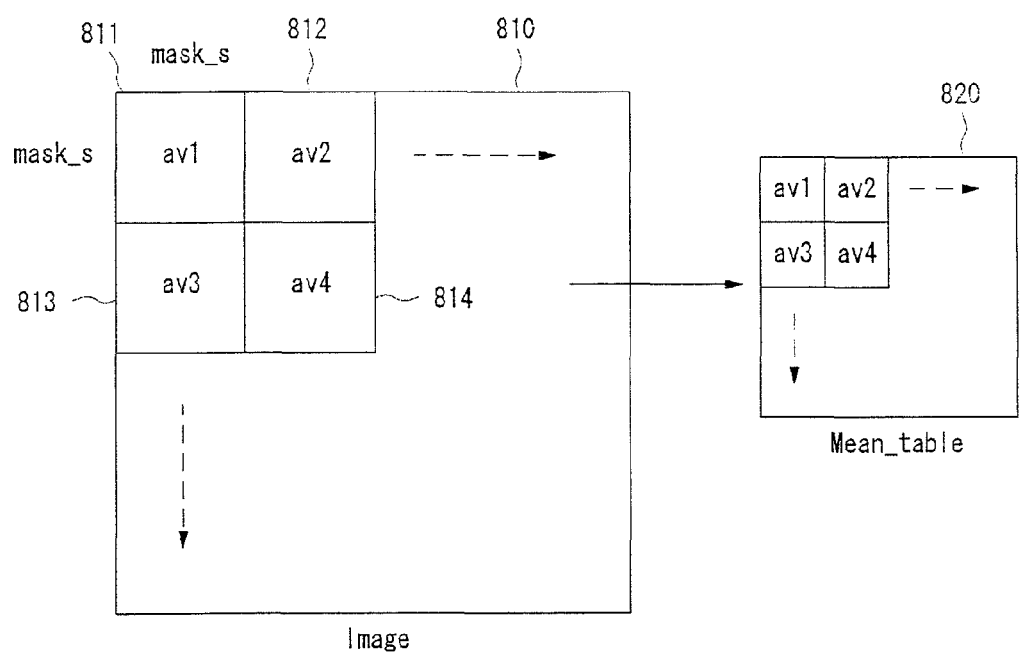
FIG. 8 is a diagram illustrating a method of calculating a local brightness average.
Figure 9:
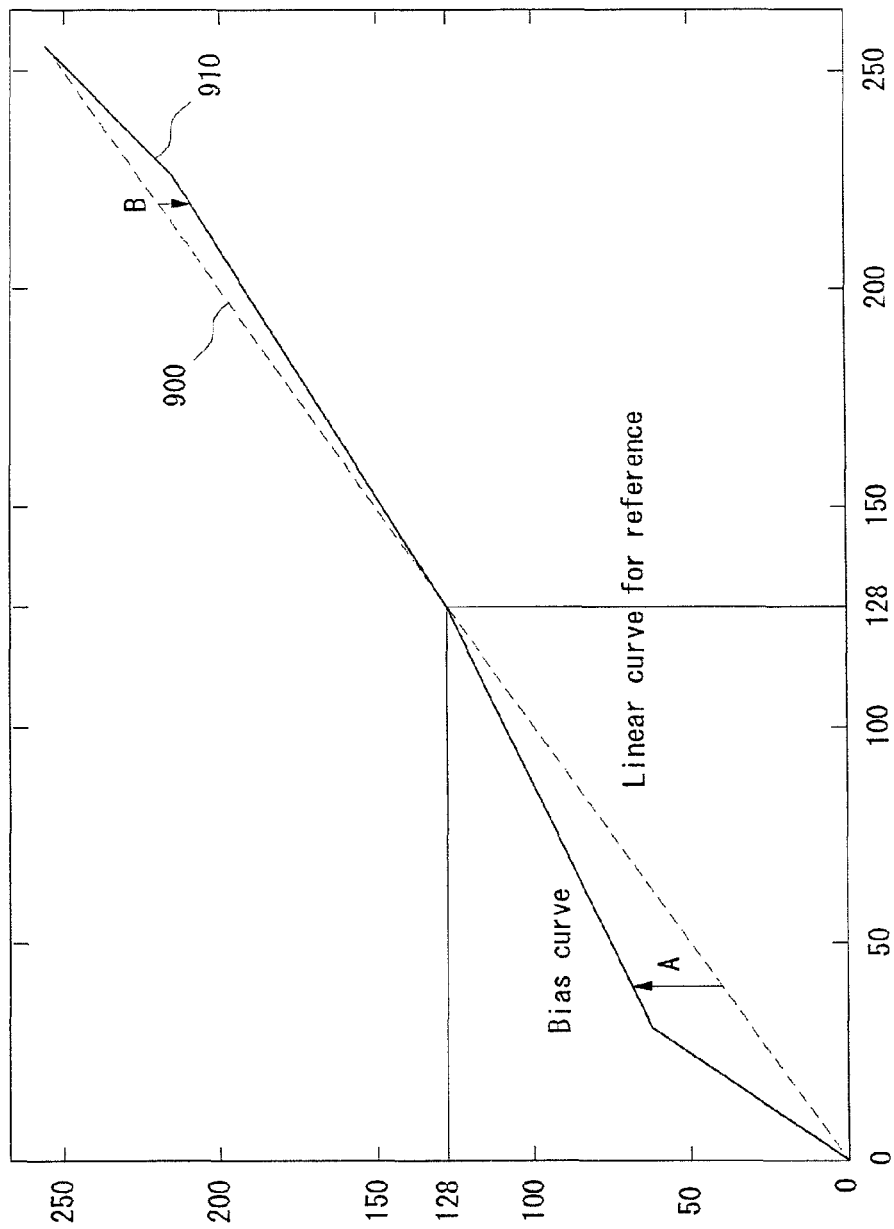
FIG. 9 is a diagram illustrating a bias curve graph.
Figure 10:
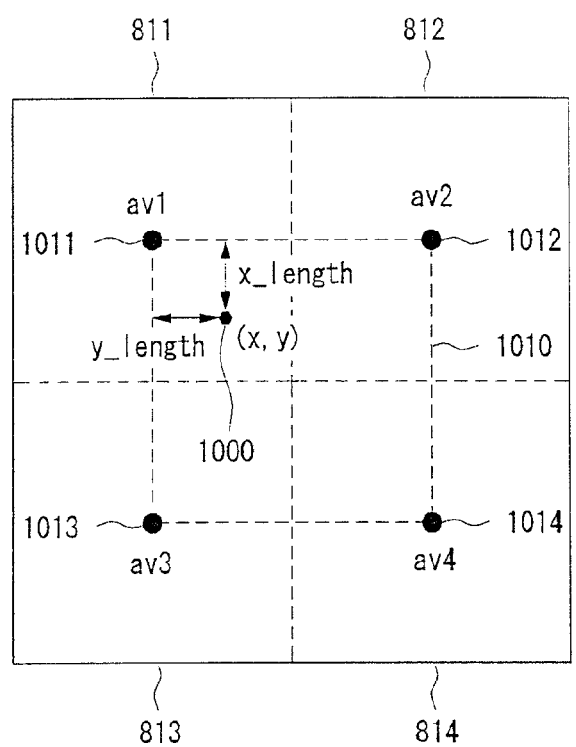
FIG. 10 is a diagram illustrating a bi-linear interpolation method.
Figure 11:
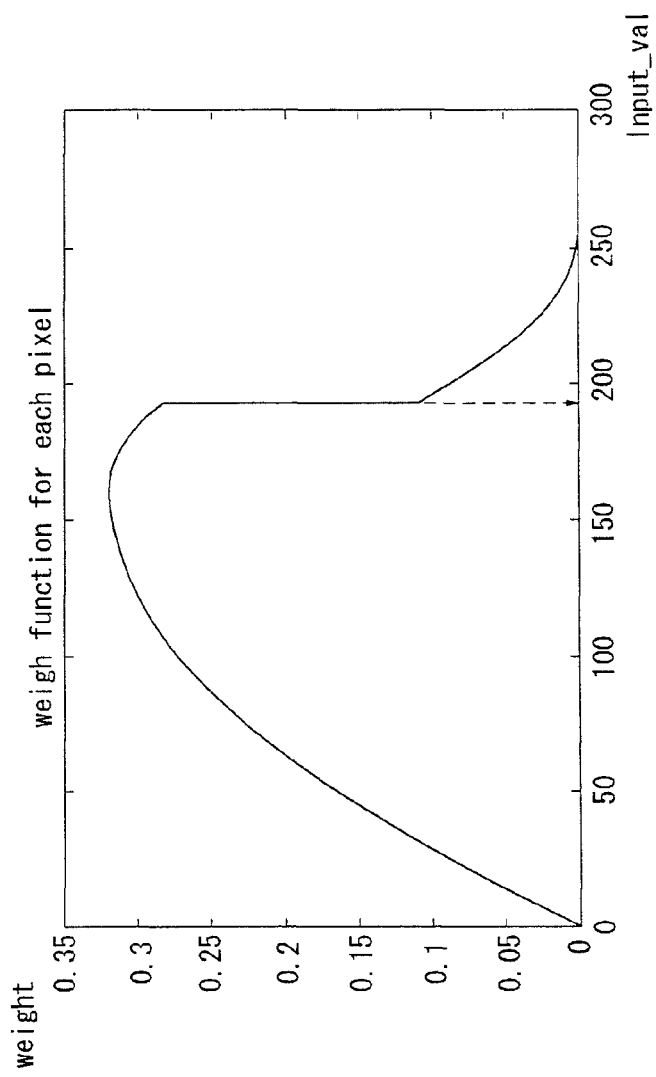
FIG. 11 is a diagram illustrating a weighting function graph.

FIG. 6 is a diagram schematically illustrating an image brightness control device according to a second embodiment of the invention and FIG. 7 is a diagram schematically illustrating a dynamic range information acquiring unit. FIG. 8 is a diagram illustrating a method of calculating a local brightness average, FIG. 9 is a diagram illustrating a graph of a bias curve, FIG. 10 is a diagram illustrating a bi-linear interpolation method, and FIG. 11 is a diagram illustrating a graph of a weighting function.

The image brightness control device 220 according to the second embodiment of the invention includes a preprocessing unit 610 and a tone mapping unit 620 (see FIG. 6). The preprocessing unit 610 acquires dynamic range information and local brightness averages from the input image. The tone mapping unit 620 tone-maps the input image using the acquired dynamic range information and the acquired local brightness averages.

Here, the preprocessing unit 610 acquires the dynamic range information and the local brightness averages of the N-th frame of the input image. The tone mapping unit 620 tone-maps the N-th frame or the subsequent frame ((N+1)-th frame, (N+2)-th frame, and the like) using the acquired dynamic range information and the local brightness averages.

The preprocessing unit 610 includes a dynamic range information acquiring unit 612 and a local brightness average calculating unit 614.

The dynamic range information acquiring unit 612 acquires the dynamic range information of the input image. The dynamic range information acquiring unit acquires a histogram of the brightness values of the pixels in the input image, sets an image range having a predetermined size from the CDF values of the brightness values, and sets the image range as the dynamic range.

The local brightness average calculating unit 614 partitions the input image into local areas having a predetermined size and calculates the brightness averages of the local areas. Thereafter, the tone mapping unit 620 performs a tone mapping operation using the local brightness averages.

The meanings of the terms used in the preprocessing unit 610 are shown in Table 2.

TABLE 2

| Terms | Description |
| --- | --- |
| image_size | Size information of image, that is, horizontal(width) × vertical(height). |
| histogram | Brightness values V(0~1) are scaled to 0~$2^n$ − 1 and the number of cases where the values appear in image. |
| CDF | Function of histograms accumulated from 0 (maximum value is image_size when brightness value is $2^n$ − 1). |
| global_min | Value of CDF/(width × height) corresponding to A (for example, 0.001). |
| global_max | Value of CDF/(width × height) corresponding to B (for example, 0.999). |
| drange_val | Data indicating dynamic range of original image |
| mask_s | Horizontal and vertical sizes of local areas |
| mean_table | Table storing average brightness value of local areas (mask_s × mask_s). |

The dynamic range information acquiring unit 612 includes a histogram acquiring unit 710, a CDF calculating unit 720, and an image range setting unit 730 (see FIG. 7). It is assumed that the input image has an n-bit (where n is a natural number) resolution.

The histogram acquiring unit 710 scales the brightness value V of the values of H, S, and V of the pixels of the input image in the range of 0 to $2^n$-1 and expresses the number of cases where the values of V appear in the pixels in the input image as a histogram.

The CDF calculating unit 720 calculates the CDF in which the histogram acquired by the histogram acquiring unit 710 is accumulated from the brightness value of 0. When the brightness value is $2^n$-1, the maximum CDF value is the size of the input image, that is, (the number of horizontal pixels)×(the number of vertical pixels), and means the total number of pixels (image_size) of the input image.

The image range setting unit 730 sets the brightness values of the pixels, in which the values obtained by dividing the CDF values of the pixels by the size of the input image correspond to a boundary predetermined or input by a user, as a global minimum value (global_min) and a global maximum value (global_max) so as to acquire a distribution range of brightness of the pixels in the input image. When the value obtained by dividing the CDF value by the size of the input image corresponds to A (for example, 0.001), the brightness value can be set as the global minimum value. When the value obtained by dividing the CDF value by the size of the input image corresponds to B (for example, 0.999), the brightness value can be set as the global maximum value. Here, A and B are a real number between 0 and 1 and B is greater than A.

The selection in the range between the global minimum value and the global maximum value of the brightness values of the pixels in the input image is performed to exclude the influence on the noise. The brightness values of which the ratio in the image is almost zero, (for example, salt and pepper noise) are neglected to perform the image process according to the embodiment of the invention.

The dynamic range information of the input image is obtained from the global maximum value and the global minimum value set by the image range setting unit 730. That is, the value (global_max−global_min) obtained by subtracting the global minimum value from the global maximum value is determined as the dynamic range.

The local brightness average calculating procedure of the local brightness average calculating unit 614 is shown in FIG. 8. An input image 810 has the number of pixels corresponding to (the number of horizontal pixels (width))×(the number of vertical pixels (height)). The input image 810 is divided into local areas 811, 812, 813, and 184 having a predetermined size and the average of the brightness values of each local area 811, 812, 813, or 814 is calculated as the local brightness average of the corresponding local area. Here, the local areas 811, 812, 813, and 814 having a predetermined size may be a square area having the same horizontal and vertical size as $mask_{13}$ s.

The local brightness averages are stored as an average table 820 in a memory unit (such as a memory, RAM, or ROM) in the imaging apparatus 100 or an external memory unit.

The tone mapping unit 620 includes a bias curve applying unit 622, a predicted average calculating unit 624, and a stretching unit 626. The meanings of terms used in the tone mapping unit 620 are shown in Table 3.

TABLE 3

| Terms | Description |
| --- | --- |
| (x, y) | Position information of pixel value currently input. |
| input_val | Pixel value currently input. |
| Variance | Input parameter controlling degrees of stretching up and down. |

TABLE 3-continued

| Terms | Description |
|---|---|
| asymmetry | Input parameter controlling degrees of stretching up and down to be different from each other. |
| pre_av | Predicated average value at current pixel using neighboring average brightness values |

The tone mapping unit 620 performs a local tone mapping operation on the local areas after the local brightness average calculating unit 614 calculates the local brightness averages, not the entire average of the input image. In other words, when the brightness value of a pixel is greater than the brightness values of the neighboring pixels, the tone mapping unit maps the pixel onto a greater value. When the brightness value of a pixel is smaller than the brightness values of the neighboring pixels, the tone mapping unit maps the pixel onto a smaller value. This is performed to stretch the brightness values of the pixels up and down in consideration of the states of the local areas. A difference between the predicted average predicted from the local brightness average of the local area and the brightness value of the pixel of the input image, the dynamic range information of the input image, and variance and asymmetry as input parameters serve as stretching parameters. As the dynamic range is greater and the variance as the input parameter is greater, the degree of stretching is greater here, only when the brightness value of the current pixel is stretched to a smaller brightness value, the asymmetry is used and is a parameter for controlling the degree of stretching of the brightness value. The tone mapping procedure of the tone mapping unit 620 is described now. Here, it is assumed that n is 8.

The bias curve applying unit 622 increases the brightness value using a bias curve 910 when the currently input brightness value (input_val) is equal to or less than 128 (see A), and decreases the brightness value using the bias curve 910 when the currently input brightness value is greater than 128 (see B). This can be seen by comparing the bias curve 910 with a reference linear function 900 shown in FIG. 9. Comparing the bias curve 910 with the reference linear function 900, the function value of the bias curve 910 is greater than the function value of the reference linear function 900 when it is less than 128. The function value of the bias curve 910 is less than the function value of the reference linear function 900 when it is greater than 128. Here, it should be understood by those skilled in the art that 128 is a reference of an embodiment and the reference can be changed.

The predicted average calculating unit 624 predicts the brightness value of the current pixel position from the local brightness average stored in the average table. When the average of the local area to which the current pixel is included is simply used, it is not possible to avoid a blocking phenomenon of the local areas. Accordingly, the brightness averages are predicted using a bi-linear interpolation method.

In FIG. 10, it is assumed that the position of the current pixel 1000 of which the predicted average should be acquired is (x,y). A rectangle 1010 in which the current pixel 1000 is located and which is obtained by connecting the centers of the local areas divided by the local brightness average calculating unit 1020 is found out. Here, it is assumed that the rectangle 1010 is the rectangle connecting the centers 1011, 1012, 1013, and 1014 of the first local area 811, the second local area 812, the third local area 813, and the fourth local area 814 and the local brightness averages of the first to fourth local areas 811 to 814 are av1, av2, av3, and av4.

The local brightness averages of the first to fourth local areas 811 to 814 are acquired from the average table (mean_table). Distance ratios (x_length, y_length) from the coordinate (x,y) of the current pixel 1000 to the side of the rectangle 1010 are calculated using Expression 12. Here, the distance ratios are values expressing the distances to two closest sides of four sides of the rectangle 1010 at a ratio of 0 to 1.

$$x\_length=((x-1) \% mask\_s)/mask\_s$$

$$y\_length=((y-1) \% mask\_s)/mask\_s \quad \text{Expression 12}$$

Here, "%" is an operation for calculating a remainder and "/" is an operation of division.

Two virtual averages av5 and av6 are acquired from the distance ratio by interpolation using Expression 13.

$$av5=(1-y\_length) \times av1 + y\_length \times av2$$

$$av6=(1-y\_length) \times av3 + y\_length \times av4 \quad \text{Expression 13}$$

A predicted average (pre_av) is predicted from two virtual averages using Expression 14.

$$Pre\_av=(1-x\_length) \times av5 + x\_length \times av6 \quad \text{Expression 14}$$

Here, x_length and y_length may be exchanged each other in Expression 13 and 14.

Thereafter, the stretching unit 626 acquires a difference between the brightness value (input_val) of the current pixel and the predicted average (pre_av) predicted using Expression 14. When the current brightness value is greater than the predicted average (input_val>pre_av), the stretching unit acquires as the final tone mapping result a value obtained by adding the difference (Diff) to a bias applied value acquired using the bias curve 910 shown in FIG. 9. When the current brightness value is smaller than the predicted average (input_val<pre_av), the stretching unit acquires the final local tone mapping result a value obtained by subtracting the difference (Diff) from the bias applied value acquired using the biar curve 910 shown in FIG. 9.

The difference (Diff) may be weighted. A difference weighting procedure is shown in FIG. 11. A value obtained by weighting the difference (Diff) as shown in FIG. 11 is added to or subtracted from the bias applied value. The asymmetry and the variance as the input parameters and the dynamic range information are used to control the degree of weighting at the time of constructing a weighting curve. As the dynamic range is greater and the variance is greater, the degree of stretching using the difference (Diff) is greater, only the degree of subtraction (−) may be independently controlled using the asymmetry parameter.

In this embodiment, the preprocessing unit 610 can acquire the dynamic range information and the local brightness average from the previous frame in advance and the tone mapping unit 620 can the dynamic range information and the local brightness averages acquired from the previous frame to the pixels of the current frame. The imaging apparatus 100 according to the invention can control the brightness in real time.

Figure 12:
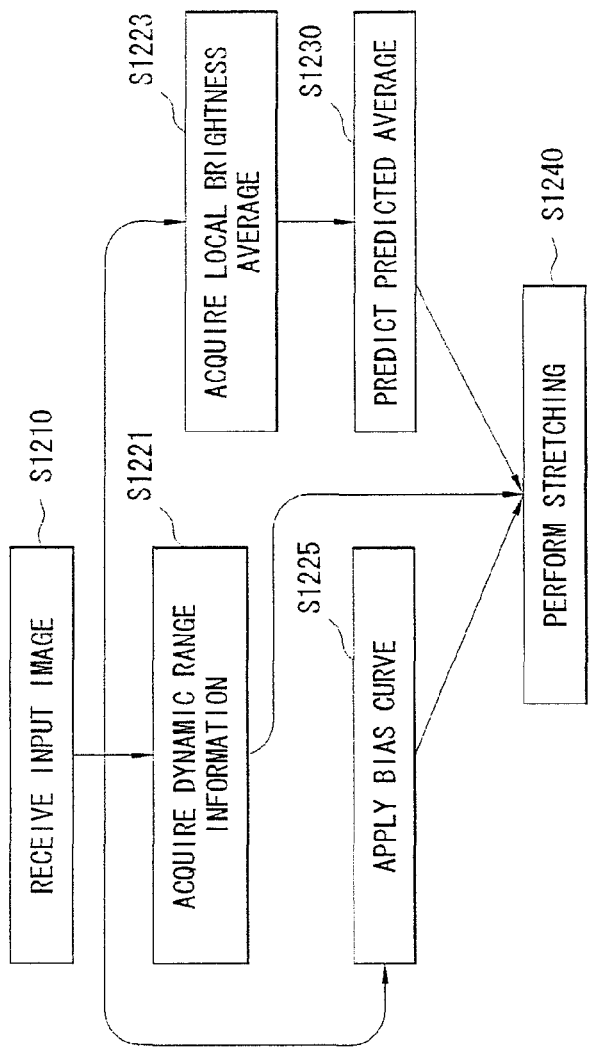
FIG. 12 is a flowchart illustrating a method of controlling the image brightness in the unit of local regions.

A local image brightness control method is described now with reference to FIG. 12. FIG. 12 is a flow diagram illustrating the local image brightness control method.

First, an image is input (step S1210). The input image is color data including brightness values and it is hereinafter assumed that the brightness value V of the HSV data is controlled. Here, it is assumed that the brightness values of the input image have an n-bit resolution.

Then, the dynamic range information of the input image is acquired (step S1211). This has been described with reference to FIG. 7 and thus is described in brief.

A histogram is acquired by scaling the brightness values of the pixels in the input image to the range of 0 to $2^n-1$ and expressing the number of cases where the corresponding values appear in the input image. A cumulative density function where the acquired histogram is accumulated in the order of brightness values (from 0 to $2^n-1$) is then acquired. An image range of the pixels in the input image is set. In order to find out the distribution range of the brightness values of the input image, the brightness values of the pixels, in which the values obtained by dividing the CDF values of the pixels by the size of the input image correspond to the boundary predetermined or input by a user, are set as the global minimum value (global_min) and the global maximum value (global_max).

Then, the local brightness averages of the input image are acquired (step S1223). The local brightness average calculating method has been described in detail with reference to FIG. 8 and thus description thereof is omitted.

A bias curve is applied to the pixels of the input image (step S1225). An example of the bias curve is shown in FIG. 9 and it should be understood by those skilled in the art that various other bias curves can be used.

The processes of steps S1221, S1223, and S1225 can be performed concurrently or with a constant interval.

Posterior to step S1223, a predicted average corresponding to the position of a current pixel is calculated using the bi-linear interpolation method from the local brightness averages (step S1230). This has been described in detail with reference to FIG. 10 and thus detailed description thereof is omitted.

In step S1240, the value (having been subjected to step S1225) obtained by applying the bias curve to the brightness value of the current pixel of the input image is compared with the predicted average and the input image is then stretched using the dynamic range information acquired in step S1221.

Here, when the brightness value of the current pixel is greater than those of the neighboring pixels, the brightness value is mapped onto a greater value by the stretching. When the brightness value of the current pixel is less than those of the neighboring pixels, the brightness value is mapped onto a smaller value. That is, the brightness value of the current pixel is stretched up or down in consideration of the states of the local areas, thereby performing the local tone mapping.

In another embodiment of the invention, the processes of steps S1221, S1223, and 1225 may be concurrently performed to the current image in step S1240 and the bias curve applied value of the current frame, the dynamic range information of the previous frame, and the local brightness information of the previous frame may be used in stretching of step S1240, thereby controlling the image brightness in real time.

According to the third embodiment of the invention, the image brightness control device 220 can primarily improve the definition of brightness of the entire image or secondarily improve the definition of brightness of the local areas using the local brightness information.

Since the primary improvement in definition of brightness of the entire image has been described with reference to FIGS. 3 to 5, and the secondary improvement in definition of brightness of the local areas using the local brightness information has been described with reference to FIGS. 6 to 12, detailed description thereof is omitted.

Figure 13:
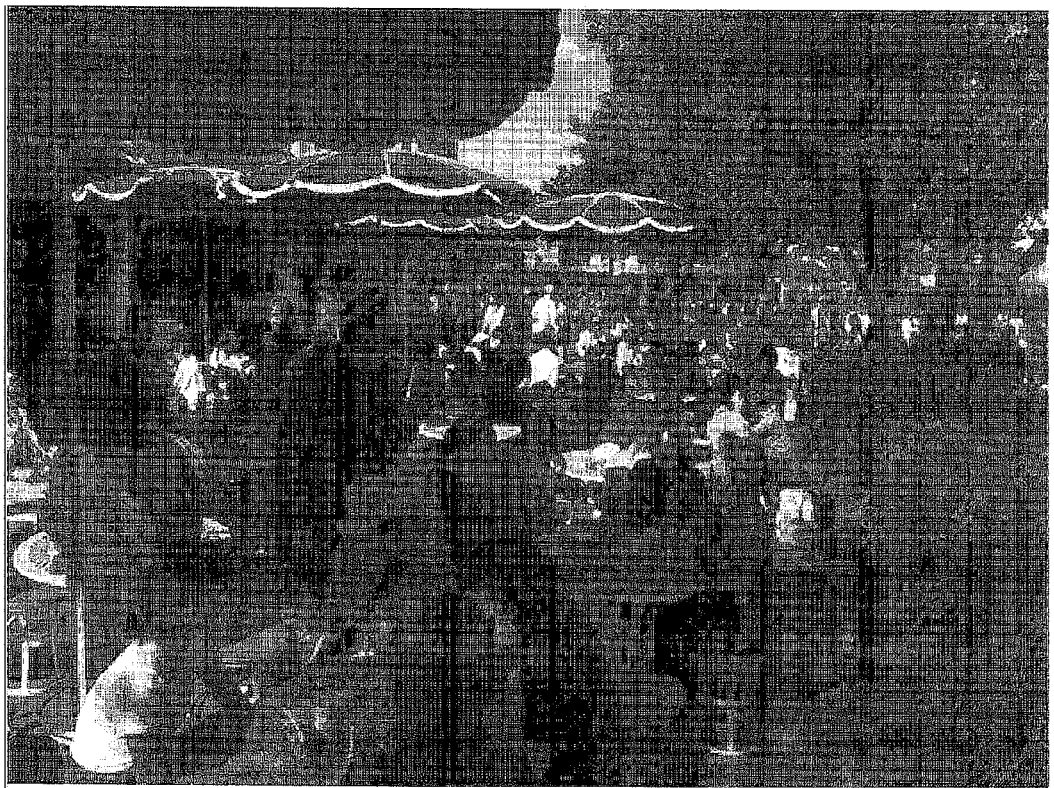
FIG. 13 is a diagram illustrating an example of an original image.
Figure 14:
FIG. 14 is a diagram illustrating an output image acquired by applying the image brightness controlling method according to the first embodiment of the invention to the original image shown in FIG. 13.
Figure 15:
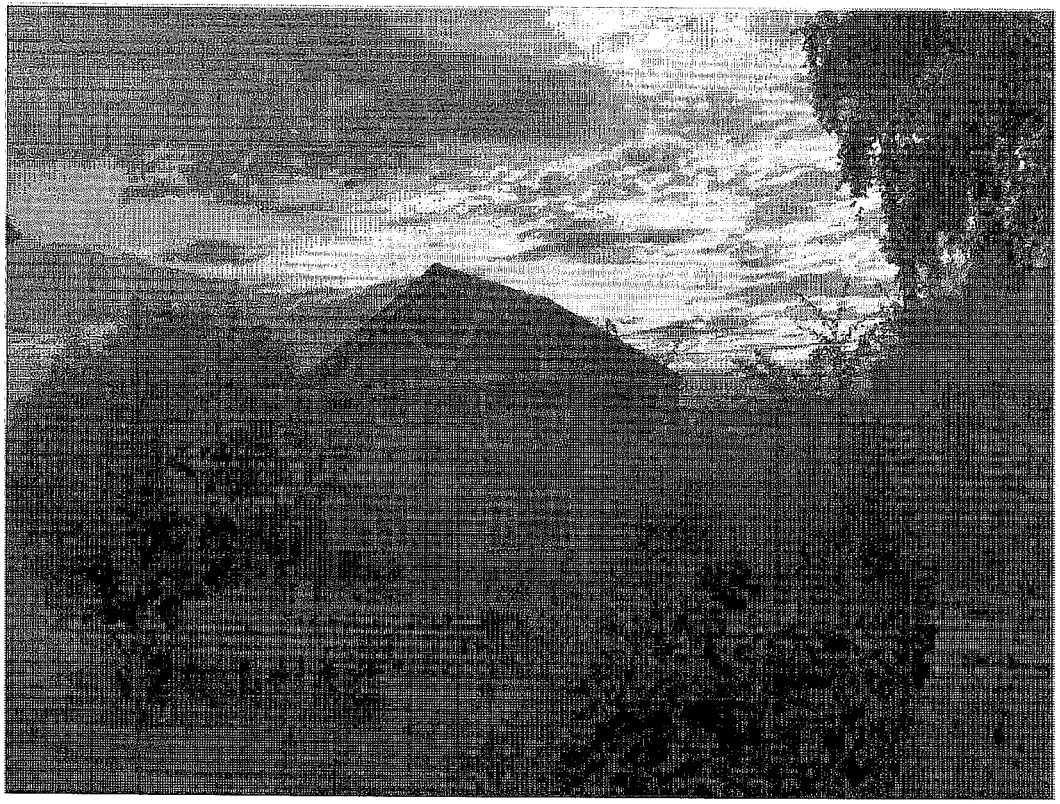
FIG. 15 is a diagram illustrating another example of an original image.
Figure 16:
FIG. 16 is a diagram illustrating an output image acquired by applying the image brightness controlling method according to the second embodiment of the invention to the original image shown in FIG. 15.

FIG. 13 shows an original image and FIG. 14 is a diagram illustrating an output image acquired by applying the image brightness control method according to the first embodiment of the invention to the original image shown in FIG. 13. FIG. 15 shows an original image and FIG. 16 is a diagram illustrating an output image acquired by applying the image brightness control method according to the second embodiment of the invention to the original image shown in FIG. 15. Compared with the original images shown in FIGS. 13 and 15, it can be seen that the output images shown in FIGS. 14 and 16 have the improved definition of brightness.

On the other hand, the above-mentioned image brightness controlling method (see FIGS. 5 or 12) may be provided as a computer program. Codes and code segments of the program can be easily reached by computer programmers in the art. The program may be stored in a computer readable recording medium and may be read and executed by a computer to embody the image brightness controlling method. The computer-readable medium includes a magnetic recording medium, an optical recording medium, and a carrier wave medium.

Although the invention has been described with reference to the exemplary embodiments, it will be understood by those skilled in the art that the invention can be modified and changed in various forms without departing from the spirit and scope of the invention described in the appended claims.

As described above, the image brightness controlling device and the image brightness controlling method according to the invention can control the dynamic range to be applied to an output image depending on the range of pixel values of an input image and input parameters.

It is possible to improve the definition of brightness so as to be matched with the characteristics of an input image by automatically considering how the distribution characteristic of an image should be reflected.

It is also possible to acquire the natural quality of image with still smaller noise than that of the conventional methods.

It is also possible to improve the definition of brightness by controlling the degree of stretching in the unit of local regions of an input image.

It is also possible to easily acquire the natural quality of image with small noise by controlling the input parameters (such as variance values and asymmetric parameters) in consideration of the degree of noise of an input image.

It is also possible to optimize the memory using the minimum memory space without requiring the troublesome calculations such as Fourier transform and several pieces of frame memories.

It is also possible to apply the invention in real time, by performing a tone mapping operation in the unit of pixels of a current frame using information acquired from a previous frame.

While the present invention has been described with reference to preferred embodiments, it will be understood that various changes and modifications may be made by those skilled in the art without departing from the spirit and scope of the present invention, as defined by the claims appended below.

What claimed is:

1. An image brightness control device to control brightness in real time, the device comprising:
   a preprocessing unit acquiring from a previous frame of an input image, dynamic range information corresponding to an image range of the input image using brightness values of color data of the input image and acquiring local brightness averages of local areas obtained by dividing the input image into the local areas having a predetermined size; and
   a tone mapping unit performing on a current frame of the input image, a local tone mapping operation on the local areas by comparing a bias applied value using a bias curve with a predicted average of a pixel in the input image predicted from local brightness values of the local areas, and not an entire brightness average of the input image, wherein the preprocessing unit includes:

a dynamic range information acquiring unit setting a predetermined region of the brightness values of the pixels of the input image as an image range; and a local brightness average calculating unit dividing the input image to a plurality of the local areas and then calculating the local brightness averages which are averages of the brightness values of the pixels in the plurality of the local areas, wherein the dynamic range information acquiring unit includes:

a histogram acquiring unit expressing the number of cases where the brightness values appear in the pixels of the input image as a histogram;

a cumulative density function (CDF) calculating unit calculating a cumulative density function obtained by accumulating the histogram with respect to the brightness values; and an image range setting unit setting a predetermined area of the cumulative density function to the image range, and wherein the tone mapping unit includes:

a bias curve applying unit acquiring the bias applied value by applying the brightness value of the pixel to the bias curve, wherein the bias applied value is less than the brightness value when the brightness value of the pixel is equal to or greater than a threshold value and is greater than the brightness value when the brightness value is less than the threshold value;

a predicted average calculating unit calculating the predicted average from the local brightness averages by the use of a bi-linear interpolation method; and a stretching unit stretching the brightness value using a difference between the bias applied value and the predicted average.

2. The image brightness control device according to claim 1, wherein the tone mapping unit thereby acquires the bias applied value of a pixel in the input image, calculates the predicted average from the local brightness averages, and stretches the brightness value of the pixel.

3. The image brightness control device according to claim 1, wherein the stretching unit applies a weight predetermined or input from a user to the difference between the bias applied value and the predicted average.

4. The image brightness control device according to claim 3, wherein the weight is set to enhance the degree of stretching as the dynamic range based on the dynamic range information is wider.

5. The image brightness control device according to claim 3, wherein the weight is independently controlled on the basis of an asymmetry parameter input from the user.

6. An image brightness control method to control brightness in real time, the method comprising:

acquiring from a previous frame of an input image, dynamic range information corresponding to an image range of the input image using brightness values of color data of the input image;

acquiring from the previous frame of the input image, local brightness averages of local areas obtained by dividing the input image into local areas having a predetermined size; and performing on a current frame of the input image, a local tone mapping operation on the local areas by comparing a bias applied value using a bias curve with a predicted average of a pixel in the input image predicted from local brightness values of the local areas, and not an entire brightness average of the input image, wherein the step of acquiring the dynamic range information includes the steps of:

expressing the number of cases where the brightness values appear in the pixels of the input image as a histogram;

calculating a cumulative density function (CDF) obtained by accumulating the histogram with respect to the brightness values; and setting a predetermined area of the cumulative density function to the image range, and wherein the step of performing the local tone mapping operation includes the steps of:

acquiring the bias applied value by applying the brightness value of the pixel to the bias curve, wherein the bias applied value is less than the brightness value when the brightness value of the pixel is equal to or greater than a threshold value and is greater than the brightness value when the brightness value is less than the threshold value;

calculating the predicted average from the local brightness averages by the use of a bi-linear interpolation method; and stretching the brightness value using a difference between the bias applied value and the predicted average.

7. The image brightness control method according to claim 6, wherein the step of acquiring the local brightness averages includes the steps of:

dividing the input image to a plurality of local areas; and calculating the local brightness averages which are averages of the brightness values of the pixels in the plurality of local areas.

8. The image brightness control method according to claim 6, wherein the step of stretching the brightness values includes applying a weight predetermined or input from a user to the difference between the bias applied value and the predicted average.

9. The image brightness control method according to claim 8, wherein the weight is set to enhance the degree of stretching as the dynamic range based on the dynamic range information is wider.

10. The image brightness control method according to claim 8, wherein the weight is independently controlled on the basis of an asymmetry parameter input from the user.

* * * * *